Nov. 14, 1939.  C. E. FRUDDEN  2,179,784

OIL FILTER

Filed Aug. 22, 1936

Inventor
C. E. Frudden
by
Attorney

Patented Nov. 14, 1939

2,179,784

UNITED STATES PATENT OFFICE 2,179,784

OIL FILTER

Conrad E. Frudden, Wauwatosa, Wis., assignor to Allis-Chalmers Manufacturing Company, Milwaukee, Wis., a corporation of Delaware Application August 22, 1936, Serial No. 97,337

3 Claims. (Cl. 210—131)

This invention pertains to filters and is especially directed to oil filters.

An object of this invention is to provide a filter of greatly simplified and rugged construction in which the number of parts is reduced to a minimum.

Another object of this invention is to provide a filter comprising an easily replaceable cartridge.

Another object of this invention is to provide a filter cartridge with a removable mass of filtering material, so that the same container may be used repeatedly.

Other objects will appear from the appended specification and claims.

The invention comprises a simplified filter having a minimum number of parts and having an easily accessible and quickly removable cartridge containing the filtering material. Either the filtering material may be removable, so that when one mass of material has become saturated with impurities it can easily be replaced by another mass within the same cartridge container; or the mass of filtering material may be permanently attached to the interior of the cartridge container by a suitable adhesive, and when a change is necessary the entire cartridge, including the container, may be replaced by another cartridge. The cartridge comprises a simple container substantially filled with a homogeneous filtering material, without the comparatively complicated features thought to be necessary in the prior art. The cartridge may be mounted with its closed end up; or it may be mounted with its closed end down, in which case it acts both as filter and sediment trap.

The drawing shows specific examples of filter structure embodying this invention.

Figure 1:
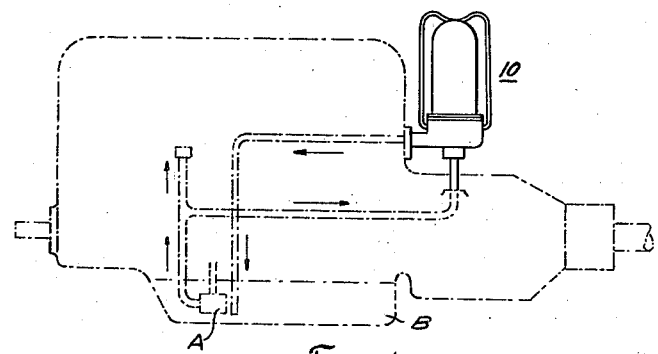
Fig. 1 is a diagrammatic showing of the filter connected in an internal combustion engine lubricating circuit.
Figure 2:
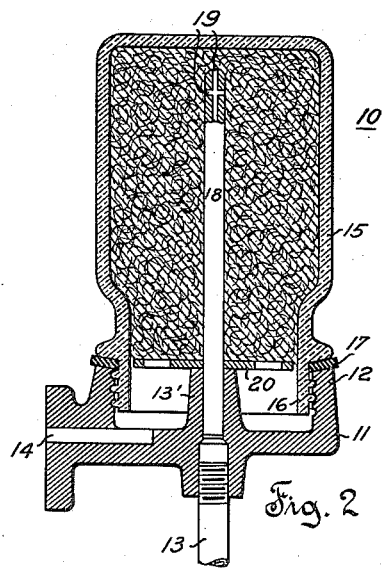
Fig. 2 is a vertical sectional view of one modification of the invention.

The filter 10 may be connected in the lubricating circuit of an internal combustion engine in the manner indicated in Fig. 1, wherein the pump A serves to circulate oil in the direction indicated by the arrows from the sump B. It will be noted that the filter is in parallel with the oil feed to the engine, so that a part of the oil is continually passed through the filter.

The filter comprises a base 11 provided with a threaded cylindrical portion 12 and inlet and outlet ports 13 and 14, respectively. A boss 13' surrounds the inner end of central inlet port 13. A filter cartridge 15, which may be of metal or, as shown, an ordinary fruit jar, is mounted with its open end adjacent to the base and communicating with the outlet port 14. The container or receptacle 15 may be attached to the base by any desired means as by screwing its threaded neck 16 on the threaded base portion 12. A gasket 17 is located between the edge of base 11 and a flange on the container neck to provide an oil tight connection therein. While a threaded connection is shown, it is clear that any other desired manner of removably fastening the container on the base may be utilized. For example, the container may be retained by a wire bail 24 pivoted on the base and adapted to be swung up over the bottom of the receptacle, to press it toward the base. Or the container may be bolted to the base by any suitable arrangement of bolts, as is obvious.

Mounted within the boss 13' and communicating with port 13 is a tube 18 having a plurality of openings 19 at its free end. The tube may be retained in place by soldering, welding or being threaded on the base, but a simple press fit is preferred. It should be noted that the tube 18 extends practically the entire length of the container 15, to discharge the oil to be filtered at or near the closed end of the container.

The receptacle 5 is filled with tightly packed filtering material 22. Any known filtering material may be used but wool or cotton waste is preferred. The filtering material is retained in the jar by a perforated retaining disk 20, which is loosely mounted on tube 18, and held in place between boss 13' and filtering material 22.

The method of operation is clear from the above description. Oil enters under pressure through inlet port 13 and is carried by tube 18 to the closed end of the container. It flows from there toward the open end, and is filtered in passing through filtering material 22. It should be noted that the pressure of the oil tends to compact the material, thus closing any open spaces that may have occurred in packing the material. The oil then flows from the outlet port 14 to the engine or sump depending on how the filter is connected in the oil circuit.

Figure 3:
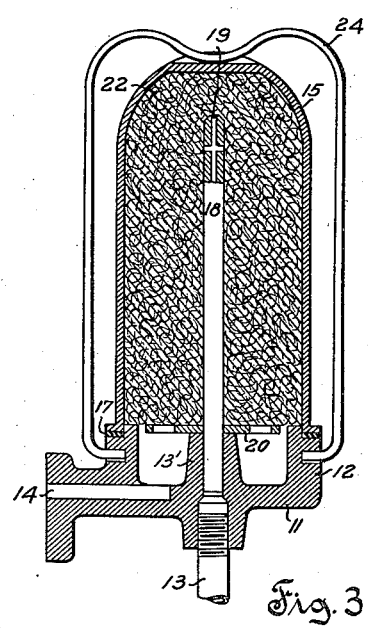
Fig. 3 is a vertical sectional view of another modified form of the invention.
Figures 4, 5:
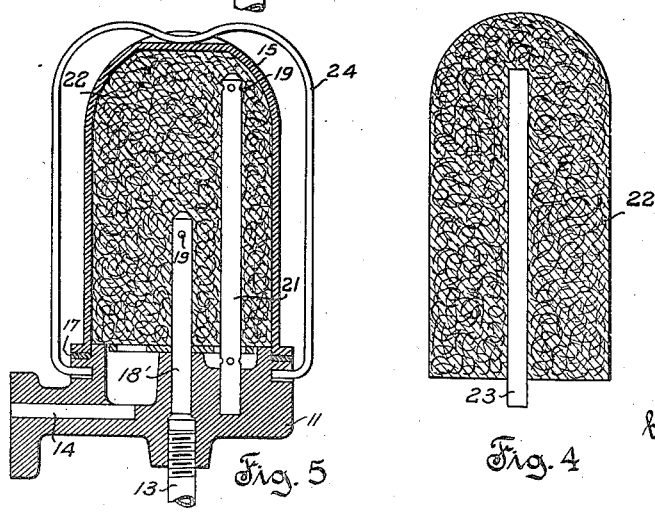
Fig. 4 is a vertical sectional view of a replaceable mass of filtering material for use in the filter of Fig. 3.
Fig. 5 is a vertical sectional view of another modification characterized by a modified flow of fluid through the filter.

When the filtering material becomes clogged, due to the amount of foreign matter caught in the filter, it is only necessary to unscrew the receptacle 15 with its material, and insert a new one in its place. The replacement cartridges consist simply of a container 15 packed with filtering material 22, with a central aperture for the tube 18. Another method of replacing the filtering material is to unscrew the cartridge, remove the wad of filtering material from the container, insert a new wad of material, and replace the same container back on the base. In the latter case, a container of uniform internal transverse dimension, such as is shown in Fig. 3, without a reduced neck portion, is used in order to make it easier to remove the saturated wad of filtering material. The new package of filtering material 22 should have a central aperture therein, retained by a temporary filled stick 23 as shown in Fig. 4 because otherwise it is practically impossible to insert the tube 18 therein. The method of preparing the wad of filtering material is disclosed and claimed in the patent to Bruesewitz No. 2,078,525, dated April 27, 1937.

While the filter has been shown mounted with its closed end uppermost, it is clear that it can also be mounted with its closed end down. When operated in this manner, the filter also acts as a sediment trap, to catch water and other relatively heavy impurities.

The method of assembling the filter cartridges is very simple. A glass or metal container 15 may be used, with or without a reduced neck portion. A mandrel is located centrally of the container and reaching to nearly the bottom thereof and the filtering material such as wool or cotton waste is packed into the container 15 and about the mandrel. The mandrel may then be withdrawn and the cartridge is ready for mounting on a base. If it is to be shipped as a cartridge a temporary filler stick 23 is preferably inserted into the central recess to maintain its configuration. If the filtering material is intended to remain in the container permanently it may be retained more firmly if the interior of the container is coated with a layer of varnish before the filtering material is inserted. This will act as an adhesive to retain the wad of cotton waste or other material in place permanently.

It will be seen that the structure disclosed is of utmost simplicity and provides a filter cartridge which may be replaced almost instantly. The cartridge, consisting solely of a container filled with a mass of filtering material, is inexpensive to manufacture. The construction provides a rugged filter which is especially adapted for rough usage, as in a tractor, for example. Moreover it can be used as a combined filter and sediment trap.

Fig. 5 shows a modification in which the central tubes 18' extend to approximately the middle of the cartridge. The oil flows from this point in both directions through the filtering material and into the outlet port through auxiliary tube 21 which is perforated at both ends. The advantage of this modification is that more oil is filtered for the same cross-section of cartridge, and that no pressure is exerted on the ends of the container, since the oil at both ends of the container is at outlet pressure, which is approximately atmospheric pressure.

It is to be understood that this invention is not limited to the specific construction herein disclosed, but is to be construed in accordance with the scope of the appended claims.

It is claimed and desired to secure by Letters Patent:

1. A filter comprising a base provided with inlet and outlet ports, one of said ports comprising a substantially straight imperforate tube having one end fixed on said base and provided with openings adjacent its other end, a container provided with a packed mass of fibrous filtering material having the fibers arranged at random therein and substantially filling said container and having a preformed aperture formed by self-supporting walls of said filtering material through a substantial portion of the length of said container, and means for removably mounting the said container with its contents on said base so that a major portion of said tube tightly fits within said aperture and directly contact said material.

2. A filter comprising a base provided with inlet and outlet ports, one of said ports comprising a tube fixed on said base and extending therefrom, a container closed at one end and open at the opposite end and filled with a packed mass of fibrous filtering material therein, said mass of filtering material being provided with a preformed self-supporting recess extending longitudinally thereof from the open end of said container to substantially the closed end thereof, and means for removably mounting said container and its contents on said base so that said tube fills said recess and snugly and directly contacts the walls thereof along substantially the entire length of said tube.

3. A filter comprising a base provided with an imperforate tube fixed on said base at one end and provided with openings adjacent its other end, an imperforate container closed at one end and filled with a mass of loose fibrous filtering material, a preformed self-supporting recess in said filtering material extending inward from the open end of said container, and means for removably mounting said container on said base so that said tube fills said recess and snugly and directly contacts the walls thereof, said other end of said tube being imbedded directly in said filtering material, whereby said tube is adapted to discharge fluid to be filtered directly into said filtering material.

CONRAD E. FRUDDEN.